US007214892B2

(12) United States Patent
Williamson

(10) Patent No.: US 7,214,892 B2
(45) Date of Patent: May 8, 2007

(54) SCALE LEVER ASSEMBLY

(75) Inventor: Sidney W. Williamson, Las Cruces, NM (US)

(73) Assignee: Metro Corporation, Las Cruces (MX)

( * ) Notice: Subject to any disclaimer, the term of this patent is extended or adjusted under 35 U.S.C. 154(b) by 68 days.

(21) Appl. No.: 11/080,048

(22) Filed: Mar. 15, 2005

(65) Prior Publication Data

US 2006/0207805 A1    Sep. 21, 2006

(51) Int. Cl.
*G01G 21/02* (2006.01)
*G01G 21/18* (2006.01)

(52) U.S. Cl. ........................... 177/170; 177/256
(58) Field of Classification Search ............. 177/170, 177/250–259
See application file for complete search history.

(56) References Cited

U.S. PATENT DOCUMENTS

| | | | | |
|---|---|---|---|---|
| 1,789,484 | A | * | 1/1931 | Walker ..................... 177/257 |
| 2,668,045 | A | * | 2/1954 | Provenzano ............... 177/257 |
| 3,811,523 | A | | 5/1974 | Artwick et al. |
| 3,961,676 | A | | 6/1976 | Terraillon |
| 4,258,812 | A | | 3/1981 | Pfeiffer |
| 4,281,727 | A | | 8/1981 | Meeks |
| 4,355,692 | A | | 10/1982 | Ostrelich |
| 4,458,771 | A | | 7/1984 | Hanssen et al. |
| 4,739,848 | A | | 4/1988 | Tulloch |
| 4,819,750 | A | | 4/1989 | Carnevale |
| 4,832,142 | A | | 5/1989 | Germanton |
| 4,844,189 | A | | 7/1989 | Shisgal et al. |
| 5,094,307 | A | * | 3/1992 | Aschke ..................... 177/256 |
| 5,133,421 | A | * | 7/1992 | Wang ........................ 177/256 |
| 5,141,065 | A | | 8/1992 | Maxwell et al. |
| 5,708,236 | A | | 1/1998 | Shaanan et al. |
| 5,721,400 | A | | 2/1998 | Haraldsson et al. |
| 5,731,548 | A | | 3/1998 | Williamson et al. |
| 5,801,338 | A | * | 9/1998 | Williamson ................ 177/179 |
| 5,955,705 | A | | 9/1999 | Germanton |
| 6,111,760 | A | | 8/2000 | Nixon |
| 6,417,466 | B2 | | 7/2002 | Gross et al. |
| 6,590,166 | B2 | | 7/2003 | Yoshida |
| 6,606,249 | B2 | | 8/2003 | Chikawa et al. |
| 6,608,260 | B2 | | 8/2003 | Montagnino et al. |
| 6,639,158 | B2 | | 10/2003 | Germanton |
| 6,677,540 | B1 | | 1/2004 | Moretto |
| 6,689,964 | B2 | | 2/2004 | Petrucelli |
| 6,797,894 | B2 | | 9/2004 | Montagnino et al. |
| 6,812,414 | B2 | | 11/2004 | Nakagawa |
| 2002/0104690 | A1 | | 8/2002 | Schurr |
| 2003/0066690 | A1 | | 4/2003 | Germanton |
| 2003/0089531 | A1 | | 5/2003 | Montagnino et al. |
| 2003/0209086 | A1 | | 11/2003 | Schurr et al. |
| 2004/0083825 | A1 | | 5/2004 | Tsutaya et al. |
| 2004/0084227 | A1 | | 5/2004 | Germanton |

* cited by examiner

*Primary Examiner*—Randy W. Gibson
(74) *Attorney, Agent, or Firm*—Brooks Kushman P.C.

(57) ABSTRACT

The present invention discloses a weighing scale having a lever assembly which includes a pair of levers. Each lever has first and second pivotal ends and an intermediate region for engaging a weight sensing mechanism. A platform is provided upon the lever assembly. Upon application of an object to the platform, a load is transmitted through the lever assembly to the weight sensing mechanism. The platform may include a top portion and a bottom portion for enclosing the lever assembly. The top and bottom portions of the platform may be secured together. A bearing insert for reducing friction in the lever assembly is provided.

21 Claims, 4 Drawing Sheets

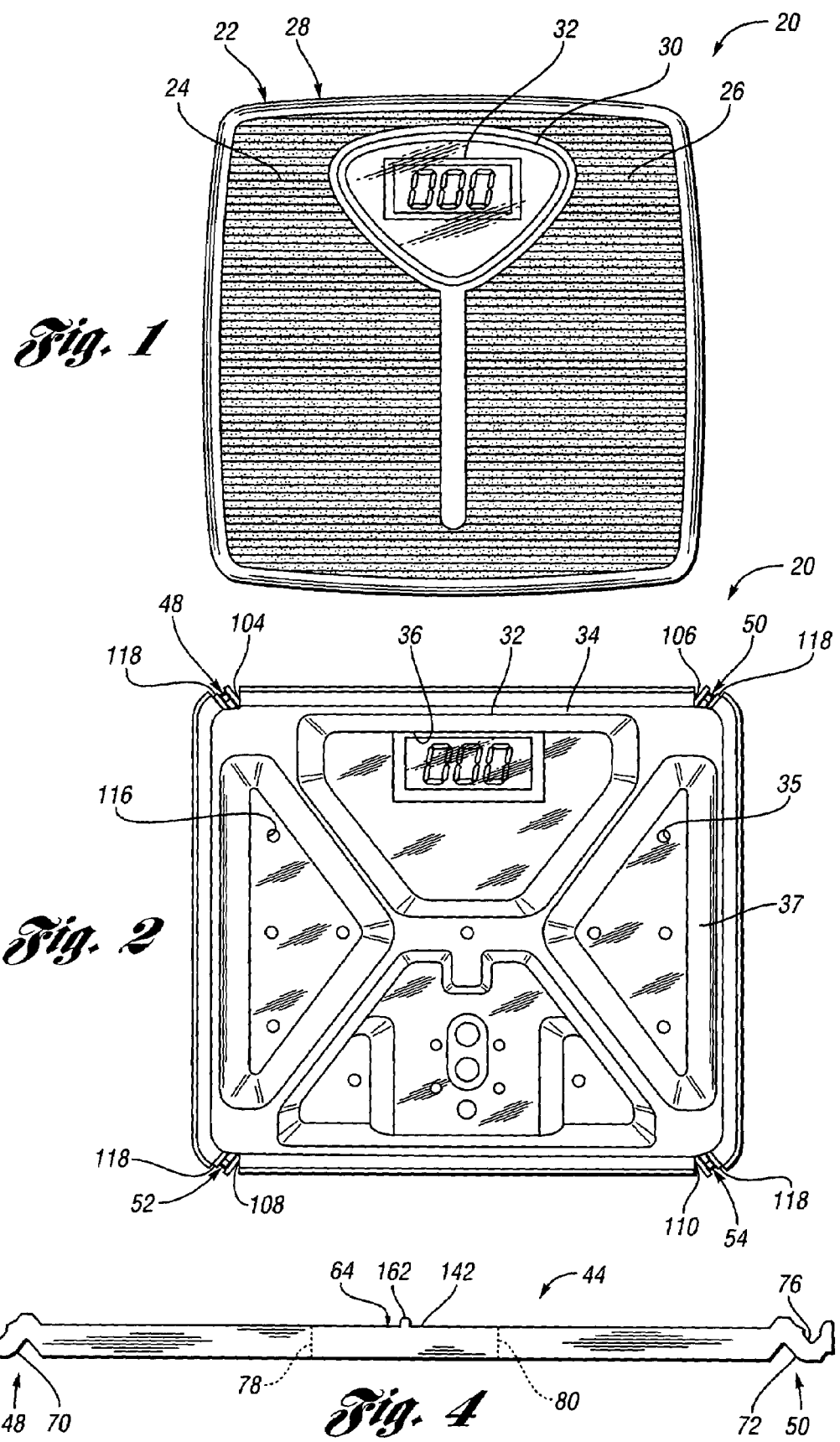

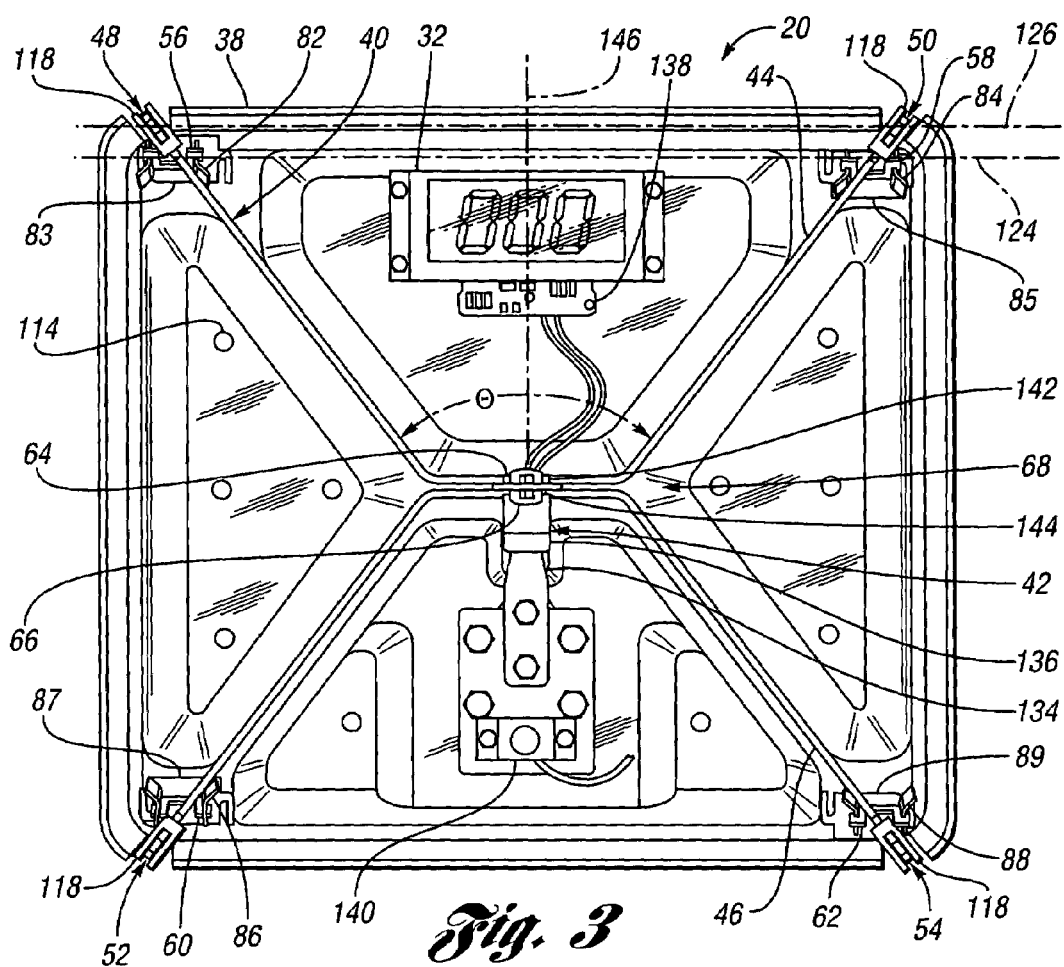
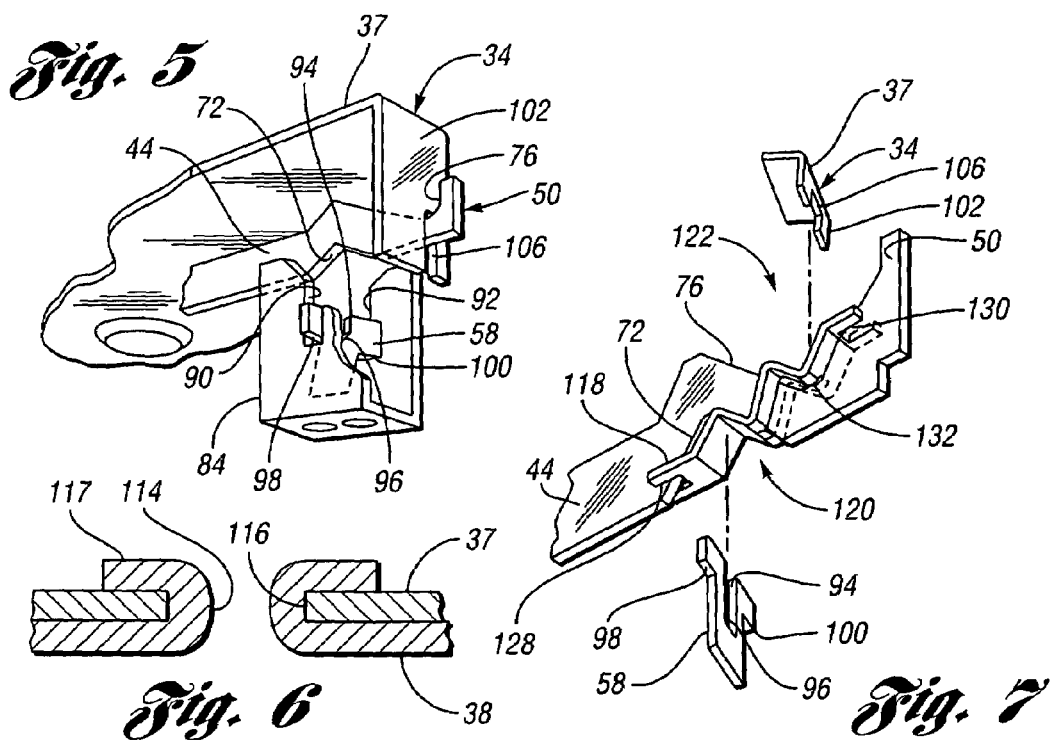

SCALE LEVER ASSEMBLY

BACKGROUND OF THE INVENTION

1. Field of the Invention

One aspect of the invention relates to a scale lever assembly, and more specifically, relates to a scale lever assembly for a platform weighing scale.

2. Background Art

Platform weighing scales have been utilized to measure the weight of a user for many years. One variety of platform weighing scales is a mechanical analog scale, which includes a base and a platform moveable relative to the base. The mechanical analog scale also includes a lever structure that is moveable responsive to movement of the base. In certain embodiments of the mechanical analog scale, the lever structure causes rotation of a dial. In other embodiments, the lever structure causes rotation of a pointer relative to a fixed dial.

The lever structure usually includes a pair of primary levers, otherwise referred to as the long levers, and a pair of secondary levers, otherwise referred to as the short levers. The primary levers are pivotally mounted to corner stands or slots located near the rear side or the front side of the base and extend and converge to a nose plate, otherwise referred to as a nose iron, located between and offset from the corner stands or slots towards the opposite side of the base. The secondary levers are pivotally mounted to corner stands or slots located at the base side opposite the side having the corner stands or slots for the primary levers. Each secondary lever connects to a primary lever intermediate the lever's ends. Each of the primary and secondary levers has a V-shaped notch located near the pivoted end for supporting knife edge metal hangers fastened to the platform. The nose plate is operatively associated with and controls movement of either the dial or the pointer.

According to another proposal, the lever structure includes a pair of flat levers. The flat levers are spaced apart and generally aligned with the placement of the user's feet upon the platform. Each flat lever is associated with a strain gauge for collectively measuring the weight of the user thereon.

In light of the foregoing, what is needed is a simplified lever structure that is both cost effective and efficient for transmitting a load of a user.

SUMMARY OF THE INVENTION

An aspect of the present invention is to provide a lever for a weighing scale having first and second engagement ends for engaging a fulcrum. The lever has first and second load receiving portions and respective extending portions that extend towards the middle of the lever. A hanging portion is located between the extending portions and operatively associates with a weight sensing mechanism.

Another aspect of the present invention is a weighing scale having a base provided with fulcrums. A first lever pivotally cooperates with a pair of fulcrums with an intermediate region therebetween extending towards a central region of the base. The second lever pivots about another pair of fulcrums and also has an intermediate region extending towards the central region of the base. A weight sensing mechanism is coupled to the first and second lever intermediate regions. A platform is supported upon the levers for transmitting a load from the platform through the levers to the weight sensing mechanism.

A further aspect of the invention is to provide a weighing scale having a base with at least two levers cooperating with base fulcrums. A weight sensing mechanism is coupled to the levers and a platform is supported upon the levers for imparting a load from the platform, through the levers to the weight sensing mechanism. At least one bearing insert is provided upon each lever for reducing friction between the lever and the corresponding fulcrum. Each bearing insert includes a retainer for retaining the bearing insert upon the lever.

The above aspects and other aspects, objects, features and advantages of the present invention are readily apparent from the following detailed description of the embodiments of the present invention when taken in connection with the accompanying drawings.

BRIEF DESCRIPTION OF THE DRAWINGS

FIG. 1 is a top plan view of a weighing scale in accordance with the teachings of the present invention;

FIG. 2 is a top plan view of the weighing scale of FIG. 1, illustrated with a cover removed therefrom;

FIG. 3 is a top plan view of the weighing scale of FIG. 1, illustrated with a platform removed therefrom;

FIG. 4 is a front side elevation view of a lever of the weighing scale of FIG. 1, illustrated flattened;

FIG. 5 is a fragmented perspective view of a lever end of the weighing scale of FIG. 1, illustrated in cooperation with a fulcrum of the scale and the platform of the scale;

FIG. 6 is a section view of the platform;

FIG. 7 is a partial exploded view of the lever end of FIG. 5;

DESCRIPTION OF EMBODIMENTS OF THE INVENTION

Figure 8:
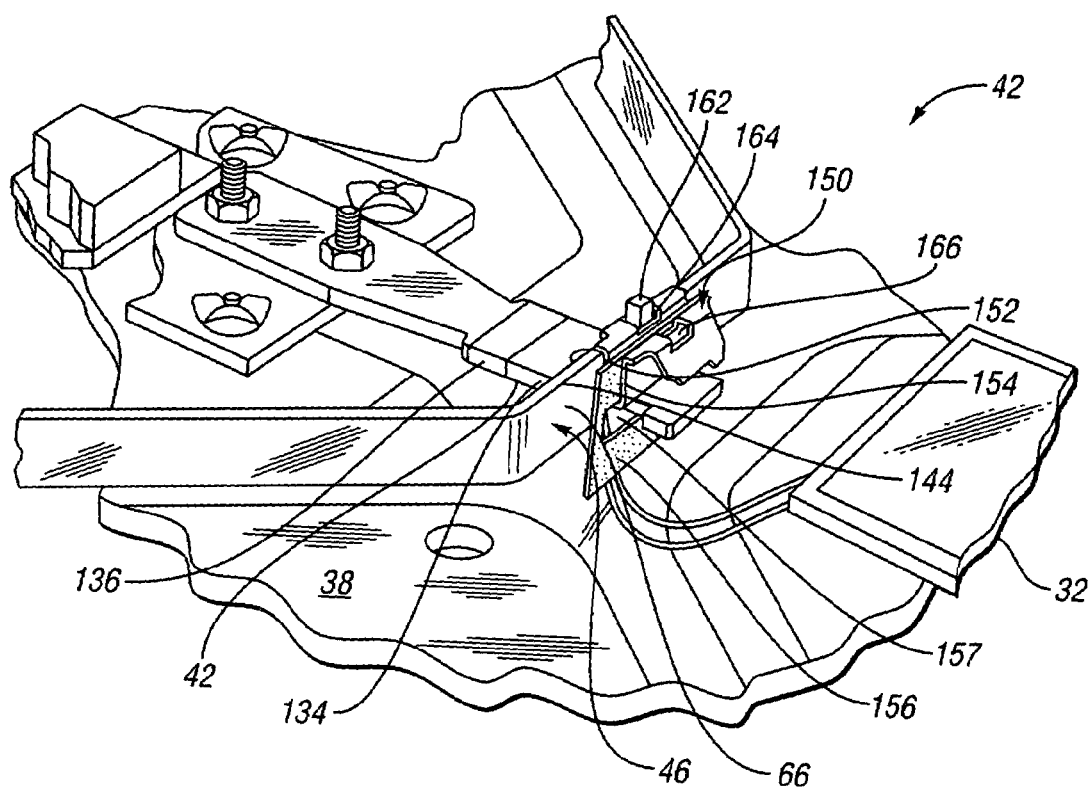
FIG. 8 is a partial perspective view of a lever assembly and a weight sensing mechanism of the scale of FIG. 1.

With reference now to FIG. 1, a weighing scale is illustrated in accordance with the teachings of the present invention, and is referenced generally by numeral 20. The weighing scale 20, as viewed from above, includes a platform cover 22 having a generally planar top surface 24 for receiving an object thereon, such as feet of a user. Accordingly, the top surface 24 may be provided with tread 26 for enhancing the traction thereupon. The platform cover 22 includes downward extending sidewalls 28 for covering the underlying structural components of the weighing scale 20 and any otherwise exposed operational components of the weighing scale 20, as will be described below.

The platform cover 22 may include a display window 30 for permitting the user to view a display 32 of the weighing scale 20. The weighing scale 20 is illustrated as an electronic weighing scale and therefore the display 32 is illustrated as an electronic display. Of course, the invention contemplates that the present invention may be utilized with any weighing scale regardless of display type.

With reference now to FIG. 2, the weighing scale 20 is illustrated with the platform cover 22 (FIG. 1) removed. Accordingly, in FIG. 2 a platform 34 is illustrated that would otherwise be enclosed within the platform cover 22. The platform 34 may be formed from steel and may be stamped. The platform 34 is a structural member for receiving a load from the platform cover 22 and transmitting it to operational components of the weighing scale 20. The platform cover 22 (FIG. 1) is fastened to the platform 34 (FIG. 2) by a plurality of snap fasteners formed in the platform cover 22 that may be received within apertures 35 formed in the platform 34. Of course, the invention contemplates that the platform cover 22 may be fastened to the platform 34 by a conventional fastener arrangement and/or adhesives. The platform 34 includes a display aperture 36 formed therethrough generally aligned with the display 32 and the display window 30.

With reference now to FIG. 3, the weighing scale 20 is illustrated with the platform cover 22 and a top portion 37 of the platform 34 removed. The weighing scale 20 includes a platform bottom portion 38 for enclosing the scale 20. The platform bottom portion 38 may be formed from steel and may be fabricated from a stamping operation. Since the platform bottom portion 38 has a similar overall size and shape to that of the platform top portion 37, the platform top and bottom portions 37, 38 may be fabricated from a common stamping operation. Of course, the platform top and bottom portions 37, 38 may require different hole patterns or other features and therefore these different features may be provided in subsequent stamping operations.

As illustrated, the weighing scale 20 is provided with a lever assembly 40 and a weight sensing mechanism 42. Briefly, the lever assembly 40 receives and supports the platform 34. When an object is placed upon the platform cover 22, the load is distributed through the lever assembly 40 to an underlying support surface and to the weight sensing mechanism 42. The weight of the user is measured by the weight sensing mechanism 42 and the measurement is conveyed to the display 32. Although an electronic weight sensing mechanism 42 and an electronic display 32 are illustrated, the invention contemplates that an analog or mechanical weight sensing mechanism and a mechanical or analog display may be utilized in accordance with the teachings of the present invention. For example, U.S. Pat. No. 5,731,548, which issued to Williamson et al. on Mar. 24, 1998 discloses a mechanical weight sensing mechanism and a mechanical display for a weighing scale. The Williamson et al. U.S. Pat. No. 5,731,548 patent is incorporated in its entirety by reference herein.

The lever assembly 40 depicted in FIG. 3 includes a pair of levers 44, 46. The levers 44, 46 are each illustrated formed in a general V-shape. Each lever 44, 46 includes a pair of distal ends labeled 48, 50, 52 and 54. Each of these lever ends 48, 50, 52 and 54 cooperate with a corresponding fulcrum provided by the lever assembly 40. These fulcrums are provided, for example, by an array of corner bearings labeled by numerals 56, 58, 60 and 62.

Each lever 44, 46, when viewed from above as in FIG. 3, has a body that may extend from the lever first end 48, 52 respectively to an intermediate region 64, 66 respectively and back to the respective second end 50, 54. The lever intermediate regions 64, 66 collectively cooperate with the weight sensing mechanism 42. As illustrated, in an unloaded condition of the lever assembly 40, the intermediate region 64, 66 of the levers 44, 46 are hung onto the weight sensing mechanism 42.

The levers 44, 46 receive a load from the platform 34 and consequently distribute that load to the lever intermediate regions 64, 66 as each lever 44, 46 pivots about the associated corner bearings 56, 58, 60, 62. This two lever design permits the weight sensing mechanism 42 to receive the load from the lever assembly 40 at a central region 68 of the platform bottom portion 38. Thus, the levers 44, 46 may be identical to one another to facilitate even load distribution and minimize manufacturing processes and product components, thereby resulting in a cost effective and efficient lever assembly 40.

Referring now to FIG. 4, one of the levers 44 is illustrated flattened for clarity. The ends 48, 50 are each adapted so that the lever 44 may pivot about the corner bearings 56, 58. As illustrated, the first and second ends 48, 50 of the lever 44 each include a notch 70, 72 respectively formed in an underside of the lever 44. Each notch 70, 72 is adapted to receive a portion of the corresponding corner bearing 56, 58 therein. The notches 70, 72 of the lever 44 are illustrated having an inverted V-shape.

Each of the levers 44, 46 are adapted to receive a load from the platform 34. Referring specifically to the first lever 44, in FIG. 4, the lever includes a pair of load receiving configurations, which are represented by notches 74, 76 that are formed through a top side of the lever 44. The load receiving notches 74, 76 are each generally offset from the respective pivot notches 70, 72 so that loads imparted to the load receiving notches 74, 76 cause the lever 44 to pivot about the pivot notches 70, 72. For example, the load receiving notches 74, 76 of the lever 44 are offset outboard of the corner bearings 56, 58 as illustrated in FIG. 3 such that the intermediate region 64 is pivoted upwards and away from the platform bottom portion 38.

The levers 44, 46 may be symmetrical for even load distribution upon each lever. Additionally, the levers 44, 46 may be identical for even load distribution and ease in manufacturing. The levers may be formed from any structural material such as steel. The levers may be manufactured from stock steel, such as coil stock and may be stamped initially in a flat profile as illustrated in FIG. 4. The stock material provides levers 44, 46 each having a uniform thickness as illustrated in the top plan view of FIG. 3. Subsequent to the stamping process, the levers 44, 46 are each bent, for example by a press or the like, into the general V-shape as viewed in FIG. 3. Thus, each lever 44, 46 may include any number of bends in order to maintain this profile. Referring again to FIG. 4, the first lever 44 is illustrated having a pair of dashed lines 78, 80 each of which represents an axis about which the lever is bent to provide the V-shaped profile. For the levers 44, 46 illustrated in FIG. 3, the bend axes 78, 80 are provided in an orientation that is generally perpendicular to a thickness direction of the lever material.

With reference now to FIG. 5, the second end 50 of the first lever 44 is illustrated in cooperation with the platform 34 and is also illustrated partially exploded with respect to the associated second corner bearing 58. Each corner bearing 56, 58, 60, 62 rests within a corner bearing holder which are illustrated in FIG. 3 and labeled with numerals 82, 84, 86 and 88. Referring again to FIG. 5, the second corner bearing holder 84 is a U-shaped bracket that includes a pair of slots 90, 92 formed therethrough for receiving the second corner bearing 58. Each corner bearing holder 82, 84, 86, 88 extends through a corresponding aperture 83, 85, 87, 89 formed through the platform bottom portion 38 and rests directly upon the underlying support surface. Each corner bearing holder 82, 84, 86, 88 may include a contact pad for engaging the underlying surface. The corner bearing holders 82, 84, 86, 88 collectively provide a support base for the scale 20 by supporting the lever assembly 40 and consequently the platform 34.

The second corner bearing 58 includes a centrally displaced slot 94 formed therein for receiving the second end notch 72 of the lever 44. The second corner bearing 58 includes a first knife edge 96 within the corner bearing slot 94 for providing a line contact with the second end notch 72. The second corner bearing 58 also includes a second knife edge 98 and a third knife edge 100 formed laterally upon sides thereof. The second and third knife edges 98, 100 engage the corner bearing holder slots 90, 92 respectively for providing line contacts therein.

A portion of the platform 34 is illustrated fragmented in FIG. 5. The platform top portion 37 includes a downwardly depending rim 102 formed peripherally thereabout. A series of slots, for example, may be formed within the platform top portion 37. Referring again to FIG. 2, the platform top portion 37 is illustrated with each of the slots aligned with each of the lever ends 48, 50, 52, 54; and the slots are labeled with numerals 104, 106, 108 and 110 respectively.

Upon assembly of the weighing scale 20 the underlying support surface supports each of the corner bearing holders 82, 84, 86, 88. The corner bearing holders 82, 84, 86, 88 each receive and support one of the corner bearings 56, 58, 60, 62. The corner bearings 56, 58, 60, 62 each receive and support one of the lever ends 48, 50, 52, 54. The platform 34 is received by the lever assembly 40 by each platform slot 104, 106, 108, 110 receiving the corresponding load receiving notch 74, 76. Thus, as an object or a user is received upon the platform 34 or platform cover 22, the associated load is distributed from the platform 34 to the lever assembly 40 causing the levers 44, 46 to each pivot about the associated corner bearings 56, 58, 60, 62 thereby providing a load to the weight sensing mechanism 42. In other words, the platform 34 translates relative to the corner bearing holders 82, 84, 86, 88 and the translation is resisted by the weight sensing mechanism 42, which consequently measures the applied weight.

The platform 34 may be maintained assembled by fastening the platform top portion 37 to the platform bottom portion 38. Apertures 114, 116 are formed within the platform top and bottom portions 37, 38 as illustrated in FIGS. 2 and 3. With reference to FIG. 6, the platform top portion 37 and the platform bottom portion 38 may be staked together at each corresponding pair of apertures 114, 116. One of these apertures, specifically aperture 114, may be formed like a rivet 117 that is inserted through the other aperture 116 and subsequently flattened to assemble the platform 34. Of course, the invention contemplates employing other fasteners such as screws, snaps, rivets, adhesives or the like.

Bearing inserts are known in the art of weighing scales. For example, U.S. Pat. No. 5,801,338 which issued to Williamson on Sep. 1, 1998 discloses a bearing insert utilized with a prior art lever assembly. The Williamson U.S. Pat. No. 5,801,338 patent is incorporated in its entirety by reference herein.

Referring now to FIG. 7 of the present application, a bearing insert 118 is illustrated in cooperation with the first lever 44. The bearing insert 118 includes a first trough 120 formed therein, which is sized to be received within the second notch 72 of the lever second end 50. The bearing insert 118 also includes a second trough 122 that is sized to be received within the second load receiving notch 76 of the first lever 44. The first trough 120 engages the pivot notch 72 of the lever 44 and the first knife edge 96 of the second corner bearing 58 for reducing friction therebetween, minimizing hysteresis as the lever 44 pivots, and enhancing the engagement therebetween for reducing shear applied upon the pivot notch 72 or the knife edge 96. The first trough 120 is formed at an angle relative to the second end 50 of the first lever 44 such that the first trough 120 is generally aligned with a pivot axis about which the first lever 44 pivots. This pivot axis is illustrated as a dashed line in FIG. 3 and is labeled by numeral 124. The second trough 122 engages both the load receiving notch 76 of the lever second end 50 and the second slot 106 formed within the platform 34 for enhancing the engagement therebetween as the first lever 44 pivots. The second trough 122 is also canted relative to lever second end 50 so that the second trough 122 is aligned with a contact axis (126 in FIG. 3) for receiving the platform rim 102.

The bearing insert 118 has an overall width that is greater than a material thickness of the lever for enhancing the engagement and load distribution therethrough. The bearing insert 118 also includes a pair of lengthwise slots 128, 130 and a lengthwise slot aperture 132 formed therethrough for straddling the body of the lever 44. The lengthwise slots 128, 130 may be formed undersized to provide a press fit retention of the retaining clip 118 upon the lever 44.

Referring again to FIG. 3, the weight sensing mechanism 42 illustrated includes a load cell. The load cell includes a cantilevered beam 134 that is fastened to the platform bottom portion 38. The load cell includes a strain gauge 136 for measuring the strain of the beam 134. Of course, the invention contemplates any weight sensing mechanism for utilization with the lever assembly 40 of the present invention. For example, a mechanical weight sensing mechanism may be utilized such as the one disclosed in the Williamson et al. 5,731,548 patent. Additionally, an electronic weight sensing mechanism may be utilized such as the one illustrated herein, or the one disclosed in U.S. Pat. No. 5,141,065, which issued on Aug. 25, 1992 to Maxwell et al. The Maxwell et al., U.S. Pat. No. 5,141,065 patent is incorporated in its entirety by reference herein.

The strain gauge 136 provides a signal of measurement to an electronic circuit board 138. The electronic circuit board 138 is affixed to the base adjacent to the display 32. The electronic circuit board 138 interprets the signal from the strain gauge 136 and provides a numerical indication of the measurement upon the display 32. The display may be a liquid crystal display, or the like. A power supply, such as a battery pack (not shown) is provided affixed to the platform bottom portion 38 for powering the operation of the electronic circuit board 138 and display 32. The battery pack is oriented relative to the base so that it is accessible externally for battery replacement. A start switch 140 is provided on the weight sensing mechanism 42 such that upon application of a load to the weight sensing mechanism 42 the start switch 140 is actuated which consequently sends a power-on signal to the electronic circuit board 138. The scale 20 turns off automatically.

The multiple bends provided in the forming operation of the levers 44, 46 provide each lever 44, 46 with a central portion 142, 144 that are each oriented generally perpendicular to a line that bisects an included angle formed by each of the levers 44, 46. The line is illustrated and labeled by numeral 146 in FIG. 3. The included angle is labeled θ, which for example may be eighty degrees. The central portion 142, 144 of the first and second levers 44, 46 are oriented proximate to one another and are spaced apart and generally parallel relative to one another.

With reference now to FIG. 8, the cooperation of the second lever 46 and the weight sensing mechanism 42 is illustrated. The first lever 44 is removed from FIG. 8 to assist in viewing of this cooperation. In an unloaded condition of the first and second levers 44, 46, the lever central portions 142, 144 rest upon the beam 134. A retaining clip 150 is provided for retaining the cooperation of the first lever 44, the second lever 46 and the beam 134. The retaining clip 150 is also illustrated in perspective view in FIG. 9. The retaining clip 150 includes a pair of arms 152, 154 each for engaging one of the levers 44, 46.

Figure 9:
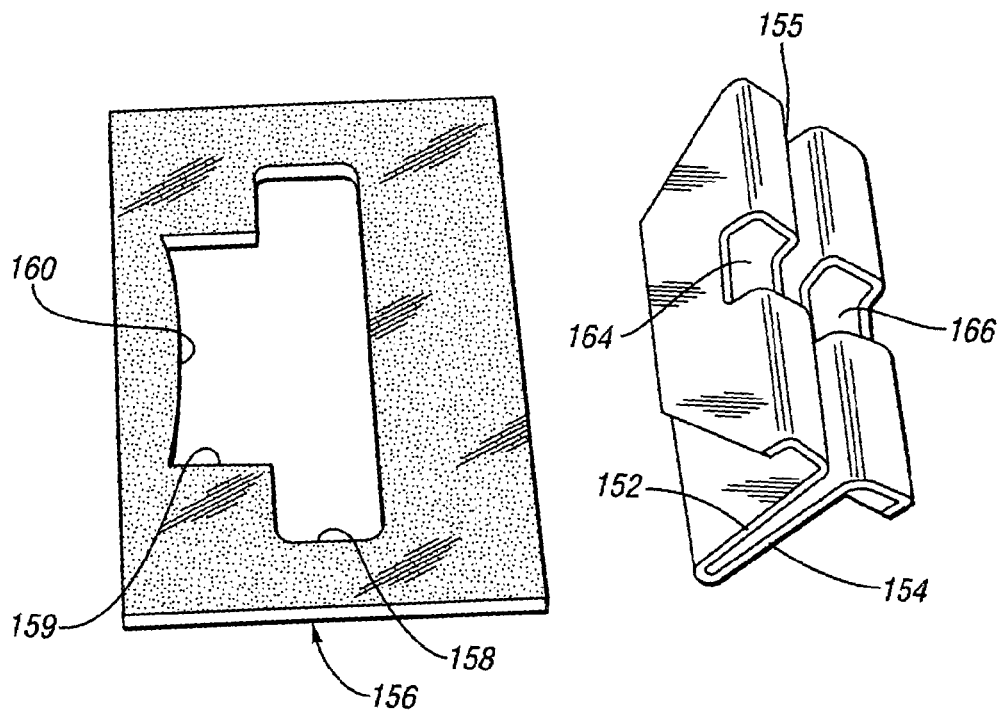
FIG. 9 is a perspective view of a retainer clip and a hanger of the weight sensing mechanism of FIG. 8.

A fold 155 is formed between the arms 152, 154 for receiving a hanger 156 therein. The hanger 156 is also illustrated in FIG. 9, disassembled from the weight sensing mechanism 42. A transverse recess 157 is formed in the beam 134 for maintaining an orientation of the hanger 156 in a lengthwise direction of the beam 134. The hanger 156 includes an aperture 158 formed therethrough that is sized to receive the beam 134. The aperture 158 includes a notch 159 having a narrowed width relative to the aperture and corresponding the width of the beam 134 at the transverse recess 157. The notch 159 includes a knife edge 160 for engaging the underside of the beam 134.

The retaining clip arms 152, 154 are each folded over the corresponding lever central portion 142, 144 for retaining the levers 44, 46 upon the beam 134. Additionally, each lever central portion 142, 144 is provided with an upstanding protuberance 162 which is received within a corresponding aperture 164, 166 of the retaining clip 150. The apertures 164, 166 maintain the alignment of the retaining clip 150 relative to the levers 44, 46.

When a load is imparted upon the lever assembly 40, the lever central portions 142, 144 urge the retaining clip 150 away from the platform bottom portion 38. The retaining clip 150 causes the knife edge 160 of the hanger 156 to engage the cantilevered beam 134 thereby applying a stress to the beam 134, which consequently strains the beam 134 temporarily. The strain is measured by the strain gauge 136 which provides a signal to the electronic circuit board 138.

Figure 10:
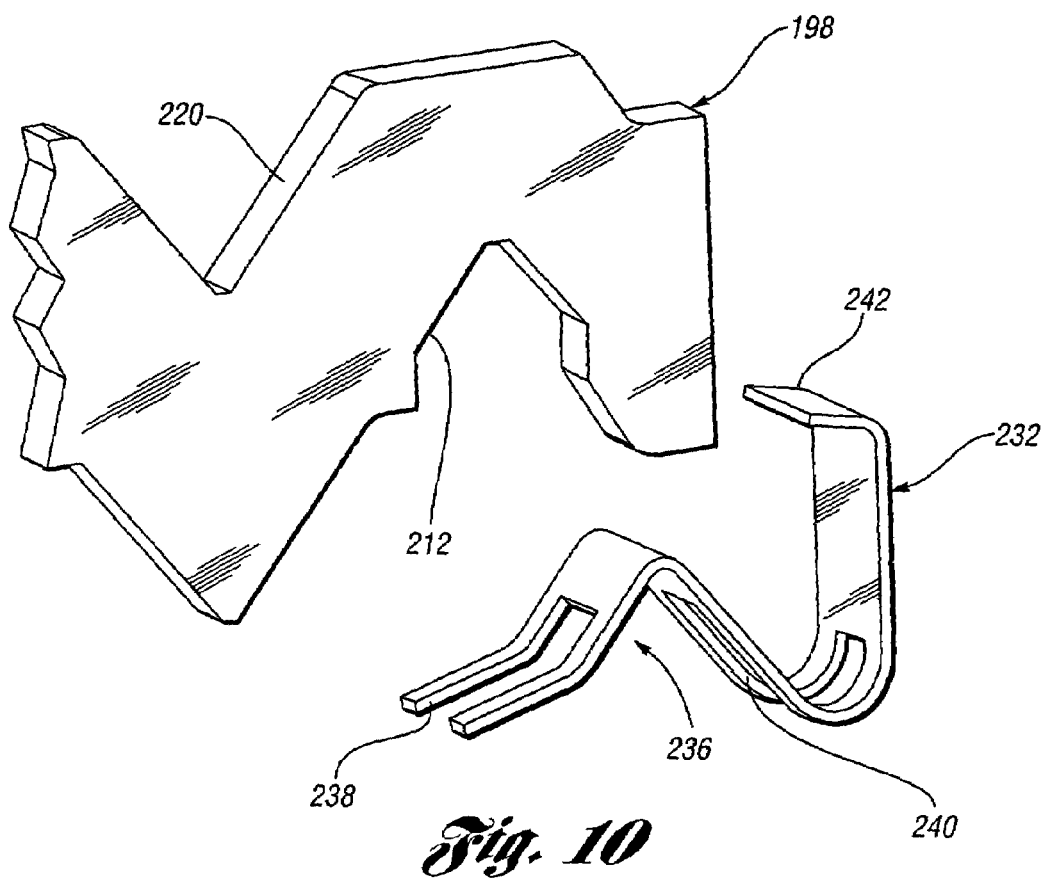
FIG. 10 is a partially exploded, enlarged perspective view of an alternative embodiment lever and bearing insert in accordance with the present invention.
Figure 11:
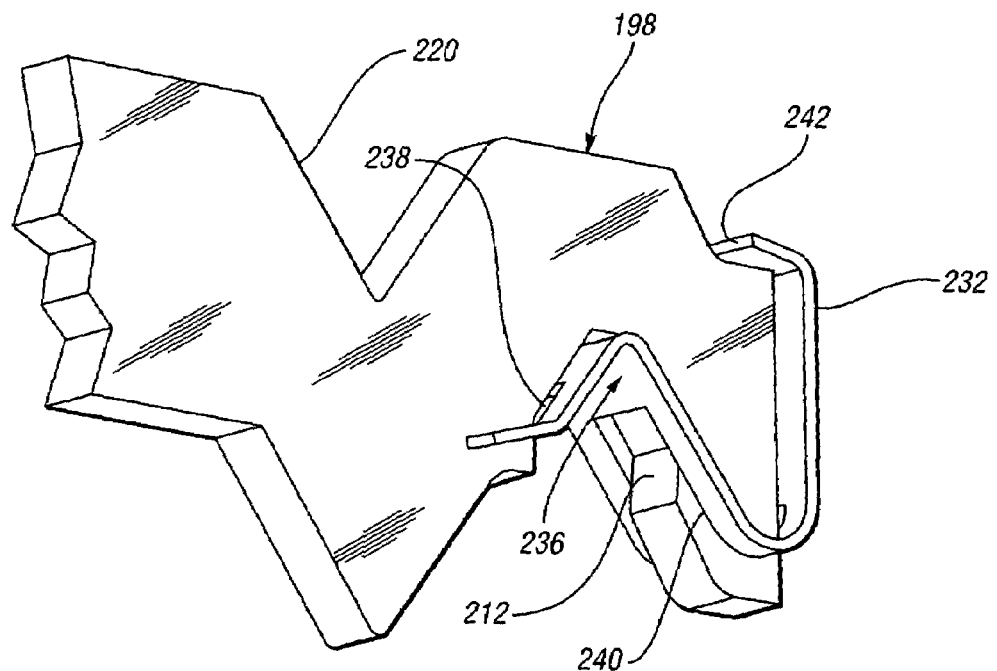
FIG. 11 is an enlarged perspective view of the lever end and the bearing insert of FIG. 10.

Referring now to FIGS. 10 and 11, an alternative embodiment lever end 198 is illustrated. Similar to the lever ends of the prior embodiment, the lever end 198 includes an inverted V-shaped notch 212 formed in an underside thereof. The notch 212 engages a fulcrum of the scale. The lever end 198 also includes a load receiving notch 220 for receiving a portion of a platform (not shown) therein. The lever end 198 is also illustrated in cooperation with an alternative embodiment bearing insert 232.

The bearing insert 232 is stamped from metal and may be, for example, formed from a stock material which may have a thickness of eighteen to twenty thousandths of an inch, for example. The bearing insert 232 is provided with a trough 236 that is sized to be received within the associated pivot notch 212 of the lever second end 198. A partial lengthwise slot 238 is formed in a distal end of the bearing insert 232 for straddling the lever end 198 therebetween. A slot aperture 240 is also provided through the bearing insert 232, adjacent the trough 236 for receiving a portion of the lever end 198 therethrough. The bearing insert 232 includes a retaining flange 242 that extends to an orientation that is spaced apart and opposing the trough 236. The retaining flange 242 engages a top surface of the lever end 198 for retaining the bearing insert 232 upon the lever end 198.

The bearing insert 232 may be formed of a resilient material, such as a spring alloy steel, so that the bearing insert 232 may be deformed upon assembly, and so that the elasticity characteristics of the material cause the bearing insert 232 to return to its unloaded condition in the assembled orientation, as illustrated in FIG. 11.

In summary, the weighing scale of the present invention simplifies the components of the lever assembly thereby reducing parts and reducing costs and processes associated with manufacturing. Additionally, by utilizing a pair of levers that are interconnected, one weight sensing mechanism is required thereby minimizing costs associated in weight sensing circuitry, measurement sensors, software and the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lever for a weighing scale comprising:
   first and second engagement ends, each end engaging a fulcrum of a weighing scale base;
   first and second load receiving portions for receiving a load imparted upon the scale;
   first and second extending portions, each extending away from the first or second engagement ends, respectively, and towards the middle of the lever; and
   a hanging portion located between the first and second extending portions for operatively associating with a weight sensing mechanism;
   wherein the lever does not extend directly between the first and second engagement ends.

2. The lever of claim 1 wherein the lever is substantially V-shaped.

3. The lever of claim 1 wherein the lever has a generally uniform thickness.

4. A weighing scale comprising:
   a scale base for resting upon an underlying support surface, the scale base having at least four fulcrums oriented in an array spaced about a central region of the base;
   a first lever having a first end pivotally cooperating with a first fulcrum of the at least four base fulcrums, an intermediate region extending generally towards the base central region, and a second end pivotally cooperating with a second fulcrum of the at least four base fulcrums, the first and second ends each having a load receiving portion that is spaced apart from the corresponding fulcrum, wherein the first lever does not extend directly between the first and second ends;
   a second lever having a first end pivotally cooperating with a third fulcrum of the at least four base fulcrums, an intermediate region extending generally towards the base central region, and a second end pivotally cooperating with a fourth fulcrum of the at least four base fulcrums, the first and second ends each having a load receiving portion that is spaced apart from the corresponding fulcrum, wherein the second lever does not extend directly between the first and second ends;
   a weight sensing mechanism affixed to the base proximate to the central region, and operatively coupled to the intermediate regions of the first and second levers; and
   a scale platform supported upon the load receiving portions of the first and second levers;
   wherein the platform may receive an object thereupon, and the weight of the object is consequently transmitted to the load receiving portions of the first and second levers thereby pivoting each of the first and second levers about the corresponding fulcrums such that the intermediate regions of the first and second levers collectively transmit a load to the weight sensing mechanism, which measures the weight of the object.

5. The weighing scale of claim 4 wherein the first and second ends of the first and second levers each have a notch formed in an underside thereof for pivoting about the corresponding fulcrum.

6. The weighing scale of claim 4 wherein the first and second fulcrums collectively provide a common pivot axis for the first lever.

7. The weighing scale of claim 4 wherein each of the levers is generally symmetrical.

8. The weighing scale of claim 4 wherein the at least four base fulcrums are further defined as at least four corner bearings;
wherein the weighing scale further comprises at least four corner bearing holders for receiving the at least four corner bearings therein; and
wherein each corner bearing includes first, second, and third knife edges, the first knife edge engaging the corresponding lever end, the second and third knife edges engaging the corresponding corner bearing holder.

9. The weighing scale of claim 4 wherein the at least four base fulcrums are further defined as at least four corner bearings;
wherein the weighing scale further comprises at least four corner bearing holders for receiving the at least four corner bearings therein; and
wherein the at least four corner bearing holders each engage the underlying support surface, collectively providing the scale base.

10. The weighing scale of claim 4 wherein the weight sensing mechanism further comprises a load cell for measuring the weight of the object on the platform, and an electronic circuit board connected to the load cell for interpreting the measurement of the load cell.

11. The weighing scale of claim 4 wherein the weight sensing mechanism further comprises a load cell for measuring the weight of the object on the platform, the load cell having a beam secured to the base for engaging the intermediate regions of the first and second levers, and a strain gauge mounted to the beam for measuring strain applied to the beam.

12. The weighing scale of claim 11 further comprising a retaining clip secured to the first and second lever intermediate regions, and a hanger secured to the retaining clip and the beam for maintaining engagement therebetween.

13. The weighing scale of claim 4 wherein the platform further comprises a top portion and a bottom portion for enclosing the lever assembly.

14. The weighing scale of claim 13 the top portion and the bottom portion of the platform are secured together.

15. The weighing scale of claim 4 wherein each of the levers is formed from a stock material having a generally uniform thickness and each lever is formed into a V-shape.

16. The weighing scale of claim 15 wherein the V-shape of each lever is obtained by bending the lever about an axis that is generally perpendicular to the material thickness.

17. The weighing scale of claim 15 wherein the distal ends of each V-shaped lever form the first and second lever ends.

18. The weighing scale of claim 15 wherein each V-shaped lever includes at least two bends formed therein forming a central portion that is generally perpendicular to an imaginary line that bisects an included angle formed by the V-shaped lever.

19. The weighing scale of claim 18 wherein each V-shaped lever is oriented such that the central portions are proximate to and spaced apart from each other.

20. A weighing scale comprising:
a scale base for resting upon an underlying support surface, the scale base having at least two fulcrums;
at least two levers each having a notch formed therein for pivotally cooperating with one of the at least two base fulcrums, a load receiving portion that is spaced apart from the corresponding fulcrum, and a load transmitting portion;
a weight sensing mechanism affixed to the base, and operatively coupled to the load transmitting portions of the at least two levers;
a scale platform supported upon the load receiving portions of the first and second levers; and
at least two bearing inserts each mounted to one of the at least two levers, each bearing insert having a trough disposed within the lever notch for engaging the respective fulcrum and reducing friction therebetween as the corresponding lever pivots, a slot formed in a lengthwise direction at least partially therethrough adjacent to the trough for receiving at least a portion of the corresponding lever therein, and a retaining flange extending to a surface of the lever that is spaced apart from and opposing the respective notch for retaining the bearing insert to the lever;
wherein the platform may receive an object thereupon, and the weight of the object is consequently transmitted to the load receiving portions of the at least two levers thereby pivoting each of the at least two levers about the corresponding fulcrums such that the load transmitting portions collectively transmit a load to the weight sensing mechanism, which measures the weight of the object.

21. The weighing scale of claim 20 wherein each bearing insert retaining flange extends about a distal end of the corresponding lever for retaining the bearing insert to the lever.

* * * * *

UNITED STATES PATENT AND TRADEMARK OFFICE
CERTIFICATE OF CORRECTION

| | | |
|---|---|---|
| PATENT NO. | : 7,214,892 B2 | Page 1 of 1 |
| APPLICATION NO. | : 11/080048 | |
| DATED | : May 8, 2007 | |
| INVENTOR(S) | : Sidney W. Williamson | |

It is certified that error appears in the above-identified patent and that said Letters Patent is hereby corrected as shown below:

Title page Item (73), Assignee reads "Metro Corporation, Las Cruces (MX)", it should read --Metro Corporation, Las Cruces, NM (US)--.

Signed and Sealed this

Twenty-first Day of August, 2007

JON W. DUDAS
*Director of the United States Patent and Trademark Office*